US010825124B2

(12) United States Patent
Liu et al.

(10) Patent No.: US 10,825,124 B2
(45) Date of Patent: Nov. 3, 2020

(54) WATERMARK IMAGE PROCESSING METHOD AND APPARATUS, DEVICE AND COMPUTER READABLE STORAGE MEDIUM

(71) Applicant: BAIDU ONLINE NETWORK TECHNOLOGY (BEIJING) CO., LTD., Haidian District (CN)

(72) Inventors: Guoyi Liu, Beijing (CN); Guang Li, Beijing (CN); Yuning Du, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 141 days.

(21) Appl. No.: 16/117,506

(22) Filed: Aug. 30, 2018

(65) Prior Publication Data
US 2019/0096022 A1    Mar. 28, 2019

(30) Foreign Application Priority Data

Sep. 27, 2017 (CN) .......................... 2017 1 0891211

(51) Int. Cl.
*G06T 1/00* (2006.01)
*G06T 7/11* (2017.01)
(Continued)

(52) U.S. Cl.
CPC ........ *G06T 1/0021* (2013.01); *G06K 9/00536* (2013.01); *G06K 9/6201* (2013.01);
(Continued)

(58) Field of Classification Search
CPC ....... G06T 1/0021; G06T 11/60; G06T 5/005; G06T 7/11; G06T 2201/005; G06T 5/50;
(Continued)

(56) References Cited

U.S. PATENT DOCUMENTS 8,023,766 B1 * 9/2011 Bergman ................. G06K 9/34
358/3.26
8,270,764 B1 * 9/2012 Agarwala ............... G06T 11/60
345/629
(Continued)

OTHER PUBLICATIONS

T. Dekel, M. Rubinstein, C. Liu and W. T. Freeman, "On the Effectiveness of Visible Watermarks," 2017 IEEE Conference on Computer Vision and Pattern Recognition (CVPR), Honolulu, HI, 2017, pp. 6864-6872. (Year: 2017).*

*Primary Examiner* — Wesley J Tucker
(74) *Attorney, Agent, or Firm* — Seed IP Law Group LLP

(57) ABSTRACT

The present disclosure provides a watermark image processing method and apparatus, a device and a computer readable storage medium. In the embodiments of the present disclosure, it is feasible to obtain at least one similar image approximate to the watermark image according to the watermark image including the watermark, and obtain a replaceable image of each similar image of said at least one similar image in the watermark area, according to a watermark area where the watermark is located in the watermark image so that it is possible to obtain a carrier image not including the watermark, according to the watermark image and the replaceable image of said each similar image in the watermark area. Since the replaceable image of the similar image in the watermark area is employed to obtain the carrier image not including the watermark, the valid content in the watermark image covered by the watermark is restored and thereby the reliability of the image is improved.

9 Claims, 5 Drawing Sheets

(51) Int. Cl.
  *G06K 9/00* (2006.01)
  *G06K 9/62* (2006.01)
  *G06T 11/60* (2006.01)
  *G06T 5/00* (2006.01)

(52) U.S. Cl.
  CPC .............. *G06T 5/005* (2013.01); *G06T 7/11* (2017.01); *G06T 11/60* (2013.01); *G06T 2201/005* (2013.01)

(58) Field of Classification Search
  CPC .............. G06K 9/6201; G06K 9/00536; G06F 16/583; G06F 16/951
  See application file for complete search history.

(56) References Cited

U.S. PATENT DOCUMENTS

| | | | |
|---|---|---|---|
| 10,127,631 B1* | 11/2018 | Duan | G06T 11/60 |
| 2005/0058319 A1* | 3/2005 | Rhoads | G06Q 20/123 |
| | | | 382/100 |
| 2005/0259820 A1* | 11/2005 | Jones | H04N 19/467 |
| | | | 380/201 |
| 2009/0196512 A1* | 8/2009 | Shelton | G06K 9/346 |
| | | | 382/229 |
| 2010/0254569 A1* | 10/2010 | Vial | G06T 1/0071 |
| | | | 382/100 |
| 2013/0176442 A1* | 7/2013 | Shuster | G06K 9/62 |
| | | | 348/207.1 |
| 2014/0049653 A1* | 2/2014 | Leonard | G06T 1/0042 |
| | | | 348/207.1 |
| 2019/0196698 A1* | 6/2019 | Cohen | G06F 16/58 |

* cited by examiner

WATERMARK IMAGE PROCESSING METHOD AND APPARATUS, DEVICE AND COMPUTER READABLE STORAGE MEDIUM

CROSS-REFERENCE TO RELATED APPLICATION(S)

The present application claims the priority of Chinese Patent Application No. 2017108912112, filed on Sep. 27, 2017, with the title of "Watermark image processing method and apparatus, device and computer readable storage medium". The disclosure of the above application is incorporated herein by reference in its entirety.

FIELD OF THE DISCLOSURE

The present disclosure relates to image processing technologies, and particularly to a watermark image processing method and apparatus, a device and a computer readable storage medium.

BACKGROUND OF THE DISCLOSURE

Usually, to identify a source of an image, a watermark, e.g., xx studio is added in a designated area in the image.

However, since the watermark might cover valid content in the image, the user cannot normally browse the valid content covered by the watermark in the image, so that reliability of the image reduces.

SUMMARY OF THE DISCLOSURE

A plurality of aspects of the present disclosure provide a watermark image processing method and apparatus, a device and a computer readable storage medium, to improve reliability of the image.

According to an aspect of the present disclosure, there is provided a watermark image processing method, comprising:

according to a watermark image including a watermark, obtaining at least one similar image approximate to the watermark image;

according to a watermark area where the watermark is located in the watermark image, obtaining a replaceable image of each similar image of said at least one similar image in the watermark area;

obtaining a carrier image not including the watermark, according to the watermark image and the replaceable image of said each similar image in the watermark area.

The above aspect and any possible implementation mode further provide an implementation mode: the obtaining the similar image approximate to the watermark image according to the watermark image to be processed comprises:

performing image search processing for the watermark image to obtain the similar image approximate to the watermark image.

The above aspect and any possible implementation mode further provide an implementation mode: the obtaining a carrier image not including the watermark, according to the watermark image and the replaceable image of said each similar image in the watermark area comprises:

according to the watermark image and the replaceable image of the each similar image in the watermark area, using an image processing technology to obtain a blocked image of the watermark image blocked by the watermark in the watermark area; and using the blocked image to perform replacement processing for an area image of the watermark image in the watermark area, to obtain the carrier image.

The above aspect and any possible implementation mode further provide an implementation mode: the image processing technology comprises at least one of an image matching processing technology and an image concatenation processing technology.

According to another aspect of the present disclosure, there is provided a watermark image processing apparatus, comprising:

a matching unit configured to, according to a watermark image including a watermark, obtain at least one similar image approximate to the watermark image;

a recognition unit configured to, according to a watermark area where the watermark is located in the watermark image, obtain a replaceable image of each similar image of said at least one similar image in the watermark area;

a restoring unit configured to obtain a carrier image not including the watermark, according to the watermark image and the replaceable image of said each similar image in the watermark area.

The above aspect and any possible implementation mode further provide an implementation mode: the recognition unit is configured to perform image search processing for the watermark image to obtain the similar image approximate to the watermark image.

The above aspect and any possible implementation mode further provide an implementation mode: the restoring unit is configured to, according to the watermark image and the replaceable image of the each similar image in the watermark area, use an image processing technology to obtain a blocked image of the watermark image blocked by the watermark in the watermark area; and use the blocked image to perform replacement processing for an area image of the watermark image in the watermark area, to obtain the carrier image.

The above aspect and any possible implementation mode further provide an implementation mode: the image processing technology comprises at least one of an image matching processing technology and an image concatenation processing technology.

According to a further aspect of the present disclosure, there is provided a device, comprising one or more processor;

a storage for storing one or more programs, said one or more programs, when executed by said one or more processors, enable said one or more processors to implement the watermark image processing method according to the above first aspect.

According to a further aspect of the present disclosure, there is provided a computer readable storage medium on which a computer program is stored, wherein the program, when executed by a processor, implements the watermark image processing method according to the above first aspect.

As known from the above technical solutions, in the embodiments of the present disclosure, it is feasible to obtain at least one similar image approximate to the watermark image according to the watermark image including the watermark, and obtain a replaceable image of each similar image of said at least one similar image in the watermark area, according to a watermark area where the watermark is located in the watermark image so that it is possible to obtain a carrier image not including the watermark, according to the watermark image and the replaceable image of said each similar image in the watermark area. Since the replaceable image of the similar image in the watermark area is employed to obtain the carrier image not including the watermark, the valid content in the watermark image covered by the watermark is restored and thereby the reliability of the image is improved.

In addition, according to the technical solutions according to the present disclosure, since the valid content of the similar image and the watermark image is substantially the same, using the replaceable image of the similar image in the watermark area to obtain the carrier image not including the watermark can enable the obtained carrier image not including the watermark to have complete valid content, and can effectively improve integrity of the image.

In addition, the technical solution according to the present disclosure can be employed to effectively improve the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

Figure 1A:
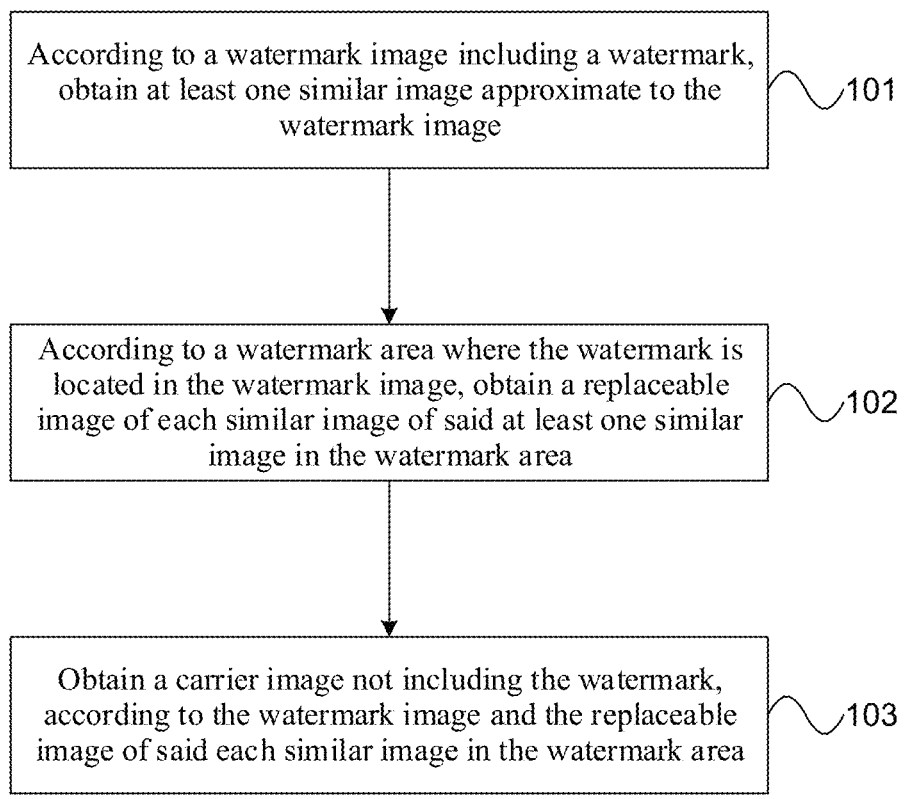
FIG. 1A is a flow chart of a watermark image processing method according to an embodiment of the present disclosure.

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually.

In addition, the symbol "/" in the text generally indicates associated objects before and after the symbol are in an "or" relationship.

FIG. 1 is a flow chart of a watermark image processing method according to an embodiment of the present disclosure. As shown in FIG. 1, the method comprises the following steps:

101: according to a watermark image including a watermark, obtaining at least one similar image approximate to the watermark image.

102: according to a watermark area where the watermark is located in the watermark image, obtaining a replaceable image of each similar image of said at least one similar image in the watermark area.

103: obtaining a carrier image not including the watermark, according to the watermark image and the replaceable image of said each similar image in the watermark area.

It needs to be appreciated that par or all of subjects for executing 101-103 may be an application located at a local terminal, or a function unit such as a plug-in or Software Development Kit (SDK) arranged in the application located at the local terminal, or a search engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, it is feasible to obtain at least one similar image approximate to the watermark image according to the watermark image including the watermark, and obtain a replaceable image of each similar image of said at least one similar image in the watermark area, according to a watermark area where the watermark is located in the watermark image so that it is possible to obtain a carrier image not including the watermark, according to the watermark image and the replaceable image of said each similar image in the watermark area. Since the replaceable image of the similar image in the watermark area is employed to obtain the carrier image not including the watermark, the valid content in the watermark image covered by the watermark is restored and thereby the reliability of the image is improved.

Optionally, in a possible implementation mode of the present embodiment, in 102, image search processing is performed for the watermark image to obtain the similar image approximate to the watermark image.

Specifically, it is feasible to use an image search technology, e.g., an image search function, namely, http://image.baidu.com provided by Baidu or Baidu image recognition function http://shitu.baidu.com, to perform image search processing for the watermark image to obtain the similar image approximate to the watermark image.

Figure 1B:
FIG. 1B-FIG. 1H are schematic diagrams of images in the embodiment corresponding to FIG. 1A.
Figure 1C:
Figure 1D:

The so-called "approximate" means that valid content of two images is substantially consistent, for example, FIG. 1B is approximate to FIG. 1C and FIG. 1D.

It may be appreciated that similar images may be images including a watermark, or images not including a watermark. This is not particularly limited in the present embodiment.

Optionally, in a possible implementation mode of the present embodiment, in 102, it is specifically feasible to use a watermark recognition technology to perform recognition processing for the watermark in the watermark image, to obtain an image area, namely, the watermark area where the watermark lies in the water image. Then, it is feasible to obtain the replaceable image of each similar image of said at least one similar image in the watermark area, according to the watermark area where the watermark lies in the water image.

Figure 1E:
Figure 1F:
Figure 1G:

Specifically, after the watermark area, e.g., a rectangular area identified in FIG. 1E, it is feasible to, according to position information of the watermark area in the watermark image, e.g., coordinate position and/or pixel position, obtain a corresponding area corresponding to the watermark area, e.g., a rectangular area identified in FIG. 1F, and a rectangular area identified in FIG. 1G, in each similar image.

In this implementation mode, the obtained corresponding area may be an area completely consistent with the watermark area in size, or an area inconsistent with the watermark area in size, so long as partial content or all content of the image in the watermark area is in the image in the corresponding area. This is not particularly limited in the present embodiment.

Then, it is feasible to, according to the corresponding area in each similar image, obtain an image of the similar image not covered in the corresponding area, namely, the replaceable image.

Figure 1H:

Optionally, in a possible implementation mode of the present embodiment, in 103, it is specifically feasible to, according to the watermark image and the replaceable image of the each similar image in the watermark area, use an image processing technology to obtain a blocked image of the watermark image blocked by the watermark in the watermark area. Then, it is feasible to use the blocked image to perform replacement processing for an area image of the watermark image in the watermark area, to obtain the carrier image as shown in FIG. 1H.

The image processing technology may include but not limited to at least one of an image matching processing technology and an image concatenation processing technology. This is not particularly limited in the present embodiment.

In the present disclosure, a method of searching for an image with an image is employed to match lost image content in the watermark image due to the blocking of the watermark, operates simply without occurrence of errors, and can effectively improve reliability of the image.

In the present embodiment, it is feasible to obtain at least one similar image approximate to the watermark image according to the watermark image including the watermark, and obtain a replaceable image of each similar image of said at least one similar image in the watermark area, according to a watermark area where the watermark is located in the watermark image so that it is possible to obtain a carrier image not including the watermark, according to the watermark image and the replaceable image of said each similar image in the watermark area. Since the replaceable image of the similar image in the watermark area is employed to obtain the carrier image not including the watermark, the valid content in the watermark image covered by the watermark is restored and thereby the reliability of the image is improved.

In addition, according to the technical solution according to the present disclosure, since the valid content of the similar image and the watermark image is substantially the same, using the replaceable image of the similar image in the watermark area to obtain the carrier image not including the watermark can enable the obtained carrier image not including the watermark to have complete valid content, and can effectively improve integrity of the image.

In addition, the technical solution according to the present disclosure can be employed to effectively improve the user's experience.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
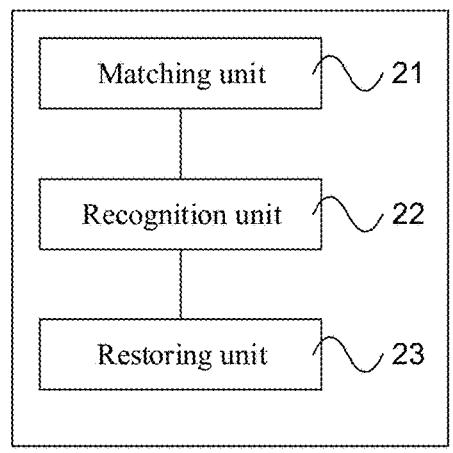
FIG. 2 is a structural schematic diagram of a watermark image processing apparatus according to another embodiment of the present disclosure.

FIG. 2 is a structural schematic diagram of a watermark image processing apparatus according to another embodiment of the present disclosure. As shown in FIG. 2, the watermark image processing apparatus of the present embodiment may include a matching unit 21, a recognition unit 22 and a restoring unit 23, wherein the matching unit 21 is configured to, according to a watermark image including a watermark, obtain at least one similar image approximate to the watermark image; the recognition unit 22 is configured to, according to a watermark area where the watermark is located in the watermark image, obtain a replaceable image of each similar image of said at least one similar image in the watermark area; the restoring unit 23 is configured to obtain a carrier image not including the watermark, according to the watermark image and the replaceable image of said each similar image in the watermark area.

It needs to be appreciated that all or part of the watermark image processing apparatus according to the present embodiment may be an application located at a local terminal, or a function unit such as a plug-in or Software Development Kit (SDK) arranged in the application located at the local terminal, or a search engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the recognition unit 22 is specifically configured to perform image search processing for the watermark image to obtain the similar image approximate to the watermark image.

Optionally, in a possible implementation mode of the present embodiment, the restoring unit 23 is specifically configured to, according to the watermark image and the replaceable image of the each similar image in the watermark area, use an image processing technology to obtain a blocked image of the watermark image blocked by the watermark in the watermark area; and use the blocked image to perform replacement processing for an area image of the watermark image in the watermark area, to obtain the carrier image.

The image processing technology may include but not limited to at least one of an image matching processing technology and an image concatenation processing technology. This is not particularly limited in the present embodiment.

It needs to be appreciated that the method in the embodiment corresponding to FIG. 1 may be implemented by the watermark image processing apparatus provided in the present embodiment. For detailed description, please refer to relevant content in the embodiment corresponding to FIG. 1, and no detailed description will be presented any longer.

In the present embodiment, the matching unit obtains at least one similar image approximate to the watermark image according to the watermark image including the watermark, and then the recognition unit obtains a replaceable image of each similar image of said at least one similar image in the watermark area, according to a watermark area where the watermark is located in the watermark image so that the restoring unit can obtain a carrier image not including the watermark, according to the watermark image and the replaceable image of said each similar image in the watermark area. Since the replaceable image of the similar image in the watermark area is employed to obtain the carrier image not including the watermark, the valid content in the watermark image covered by the watermark is restored and thereby the reliability of the image is improved.

In addition, according to the technical solution according to the present disclosure, since the valid content of the similar image and the watermark image is substantially the same, using the replaceable image of the similar image in the watermark area to obtain the carrier image not including the watermark can enable the obtained carrier image not including the watermark to have complete valid content, and can effectively improve integrity of the image.

In addition, the technical solution according to the present disclosure can be employed to effectively improve the user's experience.

Figure 3:
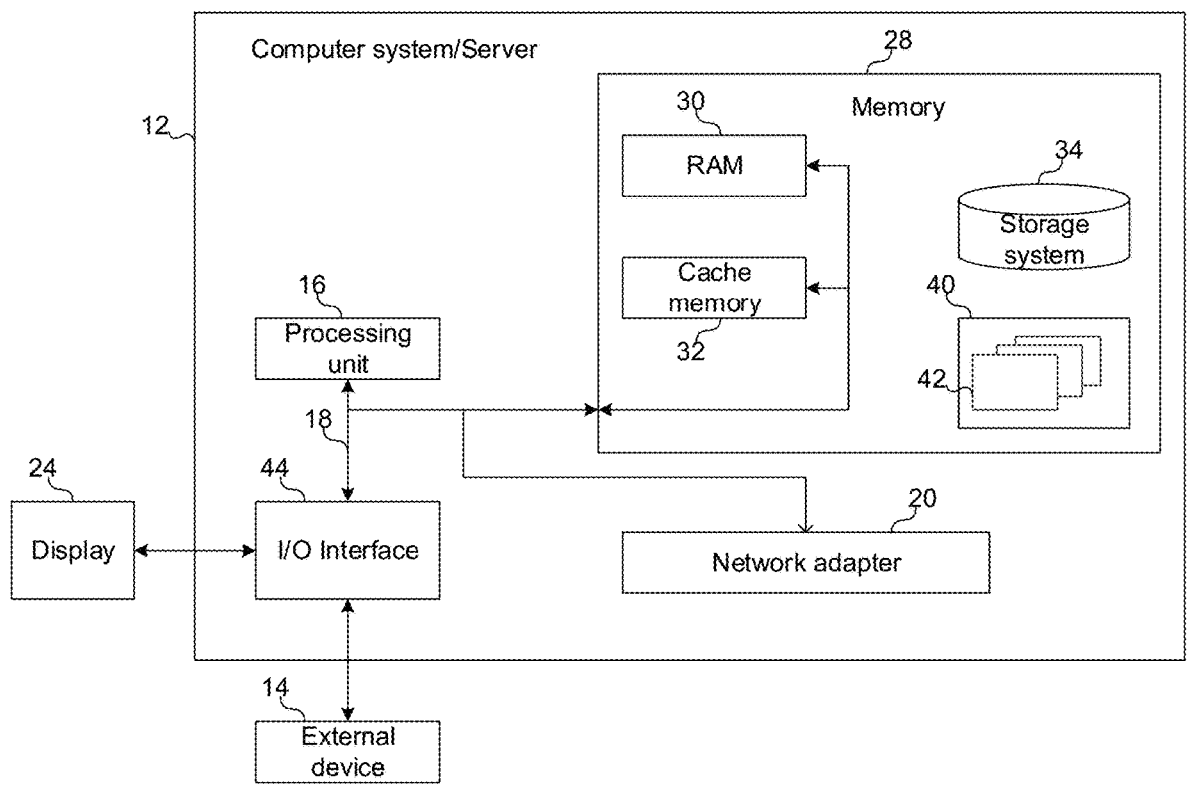
FIG. 3 illustrates a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the watermark image processing method provided by the embodiment corresponding to FIG. 1A.

Another embodiment of the present disclosure further provides a computer-readable storage medium on which a computer program is stored. The program, when executed by a processor, can implement the watermark image processing method provided by the embodiment corresponding to FIG. 1A.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

The invention claimed is:

1. A watermark image processing method, wherein the method comprises:
   according to a watermark image including a watermark, obtaining, by image search processing for the watermark image, at least one similar image whose valid content is substantially consistent with the watermark image;
   according to a watermark area where the watermark is located in the watermark image, obtaining a replaceable image area corresponding to the watermark area of the watermark image but without a watermark in said at least one similar image;
   obtaining a target image not including the watermark by replacing the watermark area of the watermark image with the replaceable image area.

2. The method according to claim 1, wherein the obtaining a target image not including the watermark by replacing the watermark area of the watermark image with the replaceable image area comprises:
   using an image processing technology to obtain the target image not including the watermark by replacing the watermark area of the watermark image with the replaceable image area.

3. The method according to claim 2, wherein the image processing technology comprises at least one of an image matching processing technology and an image concatenation processing technology.

4. A device, wherein the device comprises:
   one or more processors;
   a storage for storing one or more programs,
   said one or more programs, when executed by said one or more processors, enable said one or more processors to implement a watermark image processing method, wherein the method comprises:
   according to a watermark image including a watermark, obtaining, by image search processing for the watermark image, at least one similar image whose valid content is substantially consistent with the watermark image;

according to a watermark area where the watermark is located in the watermark image, obtaining a replaceable image area corresponding to the watermark area of the watermark image but without a watermark in said at least one similar image;

obtaining a target image not including the watermark by replacing the watermark area of the watermark image with the replaceable image area.

5. The device according to claim 4, wherein the obtaining a target image not including the watermark by replacing the watermark area of the watermark image with the replaceable image area comprises:

using an image processing technology to obtain the target image not including the watermark by replacing the watermark area of the watermark image with the replaceable image area.

6. The device according to claim 5, wherein the image processing technology comprises at least one of an image matching processing technology and an image concatenation processing technology.

7. A non-transitory computer readable storage medium on which a computer program is stored, wherein the program, when executed by a processor, implements a watermark image processing method, wherein the method comprises:

according to a watermark image including a watermark, obtaining, by image search processing for the watermark image, at least one similar image whose valid content is substantially consistent with the watermark image;

according to a watermark area where the watermark is located in the watermark image, obtaining a replaceable image area corresponding to the watermark area of the watermark image but without a watermark in said at least one similar image;

obtaining a target image not including the watermark by replacing the watermark area of the watermark image with the replaceable image area.

8. The non-transitory computer readable storage medium according to claim 7, wherein the obtaining a target image not including the watermark by replacing the watermark area of the watermark image with the replaceable image area comprises:

using an image processing technology to obtain the target image not including the watermark by replacing the watermark area of the watermark image with the replaceable image area.

9. The non-transitory computer readable storage medium according to claim 8, wherein the image processing technology comprises at least one of an image matching processing technology and an image concatenation processing technology.

\* \* \* \* \*